United States Patent [19]

Yost

[11] 4,371,891
[45] Feb. 1, 1983

[54] CHROMINANCE SIGNAL PROCESSOR

[75] Inventor: Thomas D. Yost, Indianapolis, Ind.

[73] Assignee: RCA Corporation, New York, N.Y.

[21] Appl. No.: 252,818

[22] Filed: Apr. 10, 1981

[51] Int. Cl.³ ............................................. H04N 9/535
[52] U.S. Cl. ................................................. 358/31
[58] Field of Search ............................... 358/31, 40, 23

[56] References Cited

U.S. PATENT DOCUMENTS 4,205,335  5/1980  Nakagawa et al. .................. 358/31
4,245,238  1/1981  Fuhrer .................................. 358/31
4,307,414  12/1981 Lee ...................................... 358/31

OTHER PUBLICATIONS

RCA Corporation Television Service Data Bulletin (Technical Publn. C-7, 1980), FIG. 30, pp. 38-39.

Primary Examiner—Richard Murray
Attorney, Agent, or Firm—Eugene M. Whitacre; William H. Meagher; Ronald H. Kurdyla

[57] ABSTRACT

A frequency selective chrominance signal translating circuit for use in a color television receiver employing a comb filter is disclosed. The comb filter responds to switching signals for providing separate outputs from which the luminance and chrominance television signal components are derived. The translating circuit includes first and second cascaded, bandpass filters tuned to frequencies above the chrominance subcarrier frequency. The first filter receives comb filter output signals including desired chrominance signals and undesired components at the frequency of the comb filter switching signal. The circuit prevents unwanted high frequency components, particularly those associated with the comb filter switching signals, from reaching the color demodulators of the receiver, and translates signals from the chrominance output of the comb filter for supplying chrominance signals to color demodulators with a substantially symmetrical amplitude response and linear phase response as required for proper color demodulation.

13 Claims, 7 Drawing Figures

CHROMINANCE SIGNAL PROCESSOR

This invention concerns a network included in a color television receiver for providing a required symmetrical amplitude and linear phase response for the chrominance component of a color television signal prior to demodulation of the chrominance component.

In a color television receiver arranged to process a color television signal (e.g., a television signal according to NTSC broadcast standards), proper signal processing and demodulation of the television signal chrominance component requires that the processed chrominance component exhibit a substantially symmetrical amplitude response over the band of chrominance signal frequencies (i.e., centered around the 3.58 MHz. chrominance subcarrier frequency). An additional requirement is a substantially linear phase response, which corresponds to a substantially flat signal delay response.

A typical color televison receiver includes intermediate frequency (IF) signal processing circuits prior to the chrominance signal processing channel. The response of the IF circuits is sometimes such that IF output signals exhibit a decreasing amplitude response and an increasing group delay response with respect to chrominance signal frequencies. These IF response characteristics must be compensated for in the receiver design in order to provide a chrominance component with the required symmetrical amplitude and linear phase response.

Additional receiver design requirements exist in this respect when the receiver employs a comb filter for separating the luminance and chrominance components of the color television signal. For example, when the comb filter comprises switched charge transfer devices (e.g., CCD's), the comb filter output from which chrominance component is ultimately derived should be filtered to remove switching signal frequency components and high frequency components associated with the switching signal. The comb filter switching signal is often a 10.7 MHz. signal, corresponding to the third harmonic of the 3.58 MHz. chrominance subcarrier signal frequency, and should be removed to avoid undesired interaction with subsequent chrominance signal processing and demodulation circuits. This requirement for additional filtering introduces an additional signal delay factor to be accounted for in order to achieve the desired chrominance signal response.

A comb filter employed for signal separation in one instance serves to improve the image detail of a reproduced color picture by removing visible color "edge dot" interference. This type of interference is well-known and is caused by chrominance subcarrier sideband components contaminating the luminance signal, causing so-called "edge dots" to appear at color transition regions of an image. Removal of the "edge dot" interference, however, increases the likelihood that objectionable color quadrature distortion will be visible to a viewer. This form of distortion represents a false color signal produced at the edges of a color image where color phase transitions occur, particularly with respect to large phase transitions such as are associated with color transitions from yellow to cyan and from green to magenta. The likelihood of such quadrature distortion occurring is significantly reduced or eliminated when the chrominance signal, as applied to the demodulators, exhibits a substantially symmetrical amplitude response and a linear phase (flat delay) response.

Thus it is seen that the use of a comb filter in a color television receiver increases the factors which must be considered with regard to establishing a symmetrical amplitude, linear phase response for chrominance signals to be processed and demodulated in the chrominance channel of the receiver. This response is produced by a frequency selective signal translating network according to the present invention, as disclosed herein. The network requires a minimum amount of alignment, thereby facilitating the receiver manufacture process, and does not require precision components. The network also can be easily adapted to prevent interference from switching signals and associated high frequency components such as would be encountered in a television receiver with a switched CCD-type comb filter.

The signal translating network according to the present invention is included in a color television receiver system for processing a video signal containing a luminance component, and a chrominance component with a modulated chrominance subcarrier, both disposed within a frequency spectrum of the video signal in frequency interleaved relation. The receiver system includes a source of timing signals, a comb filter responsive to the video signal and to the timing signals for providing at an output a signal including desired chrominance signals and undesired components at the frequency of the timing signals, and a demodulator for demodulating chrominance signals derived from the comb filter output. The signal translating network is included in a signal coupling path between the comb filter output and the demodulator, and responds to the comb filter output signals for supplying chrominance signals to the demodulator with a substantially symmetrical amplitude and linear phase response. The signal translating network comprises first and second bandpass filters. The first filter receives comb filter output signals including the desired chrominance signals and the undesired components at the frequency of the timing signals. The first filter comprises first and second cascaded resonant circuits tuned to provide a maximum amplitude response at a frequency greater than the color subcarrier frequency. The second filter has an input for receiving filtered signals from the first filter and an output coupled to the demodulator, and is tuned to provide a maximum amplitude response at a frequency greater than the color subcarrier frequency.

In accordance with a feature of the invention, the first filter comprises a resonant input circuit arranged in shunt with the signal path, and a resonant output circuit coupled in series with the signal path.

In accordance with a further feature of the invention, the comb filter is contained within a conductive enclosure connected to a point of radio frequency reference potential, the enclosure including a surface defining an aperture through which the comb filter output is coupled via a signal conducting path. The resonant input circuit of the first filter includes a capacitor arranged to coact with the comb filter enclosure to attenuate undesired very high frequency components of the comb filter output signal.

Figure 1:
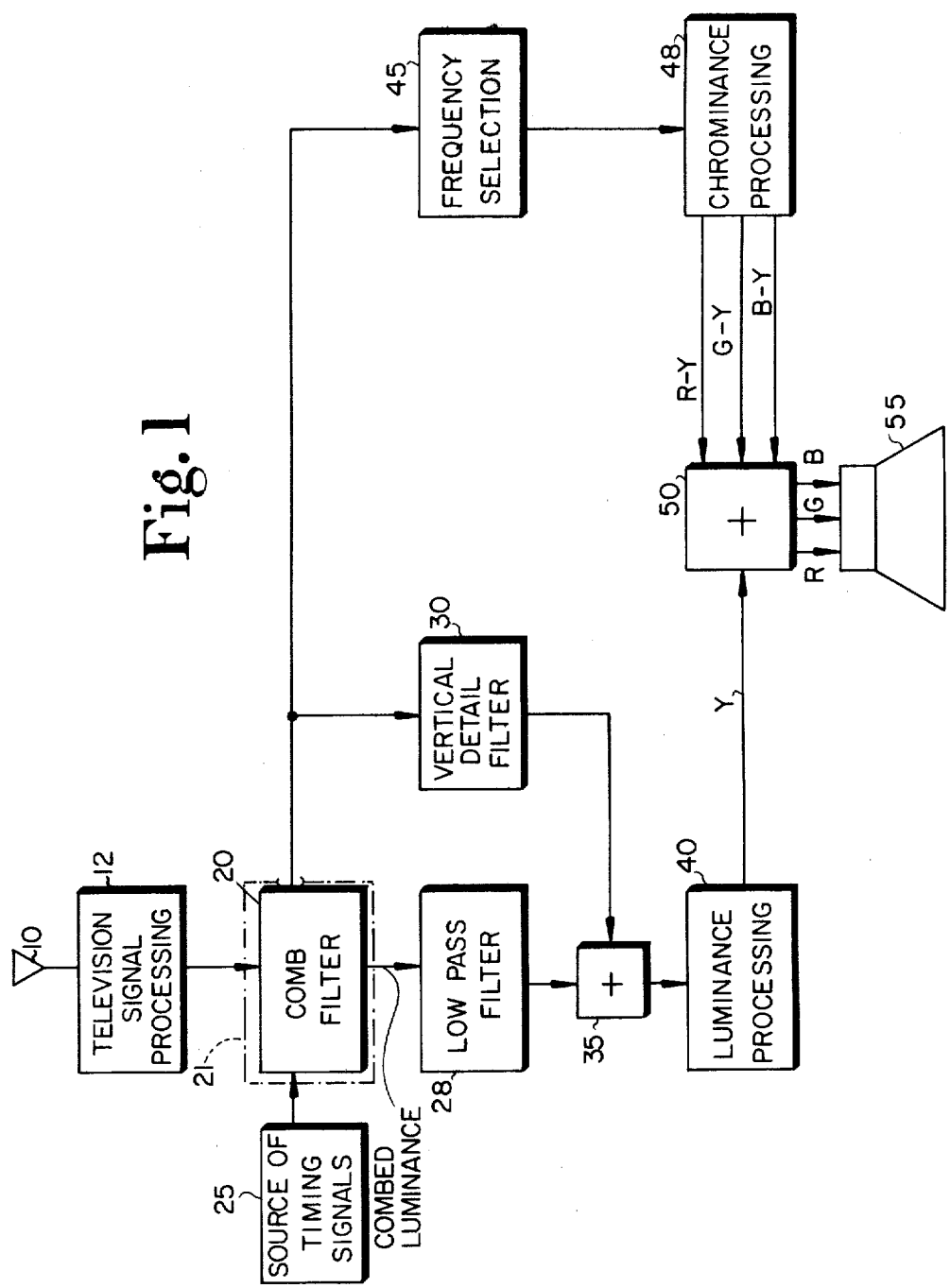
FIG. 1 shows a portion of a color television receiver including a frequency selective signal translating network according to the invention.

In FIG. 1, broadcast color television signals including image representative luminance and chrominance components are received by an antenna 10 and applied to a television signal processing network 12 of the receiver. Network 12 includes radio frequency and intermediate frequency (IF) signal processing circuits, and a video detector stage. Detected video signals from network 12, including luminance and chrominance components, are applied to an input of a comb filter 20. In this example comb filter 20 is formed of charge coupled devices (CCD's), as shown in U.S. Pat. No. 4,096,516 for example. Comb filter 20 is timed to operate (i.e., switched) in response to timing signals from a source 25. The timing signals have a frequency of 10.7 MHz., which corresponds to the third harmonic of the 3.58 MHz. chrominance subcarrier frequency. Comb filter 20 is contained within a grounded conductive enclosure 21 which serves as a shield to suppress radiation of radio frequency interference (RFI) such as can be generated by the rapid amplitude transitions of the comb filter switching signal.

The luminance and chrominance components of the detected video signal supplied to comb filter 20 are arranged within the video signal frequency spectrum in frequency interleaved relation. The luminance component has a relatively wide bandwidth (extending from D.C. or zero frequency to about four megahertz). The upper frequency range of the luminance component is shared with the chrominance component, which comprises a 3.58 MHz. subcarrier signal amplitude and phase modulated with color information. The amplitude versus frequency response of comb filter 20 with respect to luminance combing action exhibits a peak amplitude response at integral multiples of the horizontal line scanning frequency (approximately 15,734 Hz.) extending from D.C. or zero frequency, and an amplitude null at odd multiples of one-half the line scanning frequency, including the 3.58 MHz. chrominance subcarrier frequency. The amplitude versus frequency response of comb filter 20 with respect to chrominance combing action exhibits a peak amplitude response at odd multiples of one-half the line frequency including 3.58 MHz., and an amplitude null at integral multiples of the line frequency.

A "combed" luminance signal from a first output of comb filter 20 is coupled via a low pass filter 28 to an input of a signal combining network 35. Filter 28 is arranged to pass all luminance signals below a cut-off frequency of approximately 4 MHz., and serves to remove noise and switching frequency components of timing signals associated with the switching operation of comb filter 20.

A second output of comb filter 20 is applied via a frequency selective signal translating network 45 to a chrominance signal processing unit 48 including signal demodulators for generating R-Y, B-Y and G-Y color difference signals, and is also applied to an input of a low pass vertical detail filter 30. Filter 30 exhibits a cut-off frequency of approximately 1.5 MHz., and selectively passes those signal frequencies present in the second signal output of comb filter 20 which lie below this cut-off frequency. Signal frequencies in this region represent vertical detail luminance information which is absent from the combed luminance signal and which must be restored to the luminance signal to avoid loss of vertical resolution in the luminance content of a displayed image. Such vertical detail restoration is accomplished by combining an appropriate amount of the vertical detail signal from filter 30, with the filtered combed luminance signal from filter 28, in combining network 35.

The output signal from combiner 35 corresponds to a reconstituted luminance component of the color television signal. The reconstituted luminance component is afterwards applied to a luminance signal processor 40. An amplified luminance signal Y from unit 40 and demodulated color difference signal from chrominance processor 48 are combined in a matrix 50 for providing R, B and G color image representative output signals. These signals are then suitably coupled to image intensity control electrodes of a color kinescope 55.

Figure 2:
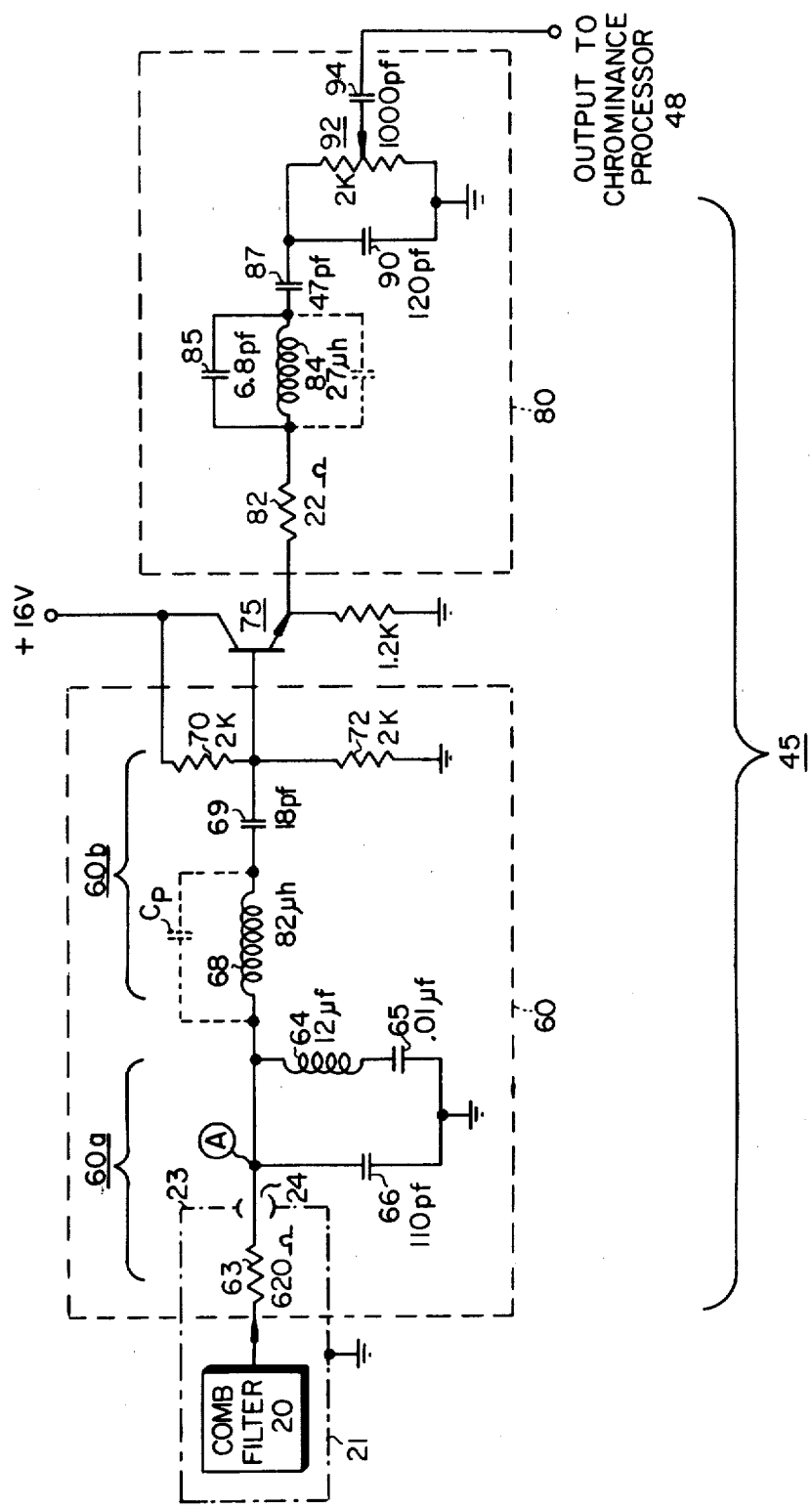
FIG. 2 shows details of the frequency selective network according to the invention.
Figure 3:
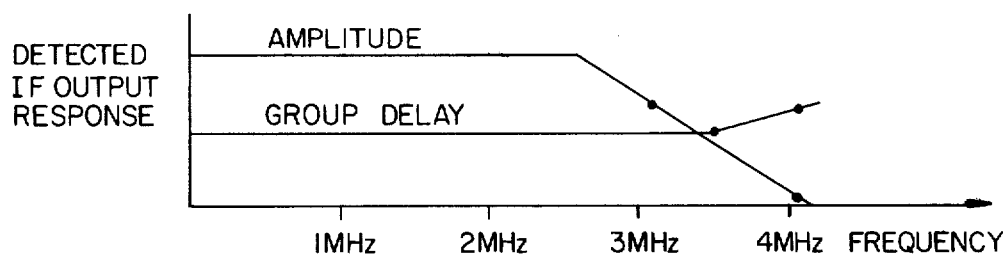
FIGS. 3–7 illustrate signal amplitude and signal delay versus the frequency responses which are useful in understanding the operation of the frequency selective network of FIG. 2.
Figure 4:
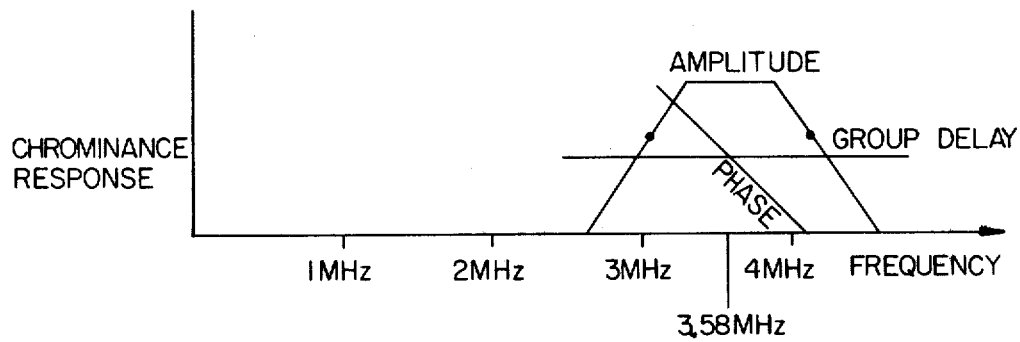

Circuit details of network 45 are shown in FIG. 2. Before considering FIG. 2, reference is made to FIGS. 3 and 4 which show logarithmic amplitude and group delay versus frequency signal responses that are pertinent to the operation of network 45.

Chrominance signal information is primarily contained in a frequency range of from 3.08 MHz. to 4.08 MHz. (the $-3$ db points) centered about the 3.58 MHz. chrominance subcarrier frequency. From FIG. 3 it is seen that, as in the case of many color television receivers, the amplitude and group delay responses of the detected video signal from network 12 respectively decrease and increase within the 3.08 MHz. to 4.08 MHz. chrominance band. Accordingly, output signals of comb filter 20 from which the chrominance signal information is ultimately derived also exhibit an amplitude and delay response of the form shown in FIG. 3. Proper demodulation of the chrominance information requires that such decreasing amplitude and increasing delay characteristics be compensated for. Compensation should be provided so that the amplitude response of chrominance signals subject to demodulation is substantially symmetrical with respect to the 3.58 MHz. center frequency over the 3.08 MHz. to 4.08 MHz. chrominance bandwidth, and so that the chrominance signal delay over this frequency range is sufficiently constant to produce a substantially linear chrominance signal phase response over this frequency range. This desired chrominance response is of the form shown by FIG. 4, and is accomplished by network 45 as shown in FIG. 2.

Referring now to FIG. 2, network 45 is shown as comprising a composite filter including a first bandpass filter 60 (a second order, two pole filter), and a single-tuned second bandpass filter 80 (a first order, single pole filter).

Filter 60 comprises a parallel-tuned inductance-capacitance (LC) input section 60a arranged in shunt with the signal path which conducts signals from the output of comb filter 20, and a series-tuned LC output section 60b which is in series with the signal path. The source impedance for filter 60 is determined by an input resistor 63 together with the output impedance of the comb filter. The output terminating impedance is determined by the parallel combination of resistors 70 and 72. The parallel-tuned input network includes capacitor 66 and and inductor 64 which are tuned to the 4.15 MHz. center frequency of filter 60. A capacitor 65 provides DC blocking. The series-tuned network comprises an inductor 68 and a capacitor 69, also tuned to the 4.15

Figure 5:
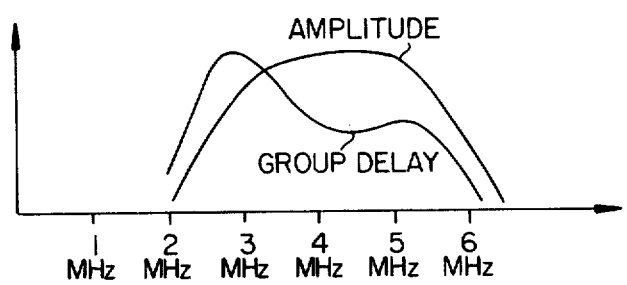

MHz. center frequency. The amplitude and group delay response of filter 60 is shown in FIG. 5.

Inductor 68 is also arranged to resonate with the parasitic capacitance (Cp) of inductor 68 to form a 10.7 MHz. trap to suppress comb filter switching signal components when present in the signal processed by filter 60. In addition to comprising an element of bandpass filter 60, input capacitor 66 is also advantageously arranged to suppress very high frequency signals which constitute radio frequency interference (RFI) signals, as follows.

In this embodiment resistor 63 is enclosed by metallic enclosure 21 which shields comb filter 20. Capacitor 66 is located external to, but in close physical proximity with, a planar surface 23 of enclosure 21 from which signals emerge via resistor 63 and an output aperture 24. Capacitor 66 comprises a ceramic disc capacitor with a ceramic wafer dielectric located between a positive or "hot" conductive planar plate connected to a node "A", and a negative (less positive) conductive planar plate coupled to the same source of ground reference potential as enclosure 21. The "hot" plate of capacitor 66 is situtated substantially in parallel with and facing surface 23 of enclosure 21.

Without capacitor 66, the portion of the conductor which couples resistor 63 to node A outside of enclosure 21 would act as an antenna for RFI energy, radiating this energy to nearby circuits. However, capacitor 66 prevents this radiation by conducting a portion of the RFI energy through the capacitor dielectric to the grounded plate of capacitor 66. The balance of the RFI energy at node A and at the connections to this node is radiated from the surface of the positive or "hot" plate of capacitor 66 toward surface 23. The RFI energy radiated from the positive plate is narrowly confined to the area between capacitor 66 and surface 23, and is returned to ground via enclosure 21. In essence, the positive plate of capacitor 66 and the facing portion of surface 23 comprise an air-dielectric capacitance for bypassing the RFI energy from the signal path. Thus the arrangement of capacitor 66 acts as a low impedance bypass for most of the RFI energy at node A, conducting it harmlessly to ground.

This mechanism eliminates RFI radiation of very high frequency components such as are associated with the rapid amplitude transitions of the 10.7 MHz. comb filter switching signals, including higher harmonics of such switching signals. Such very high frequency components extend through the IF, VHF and UHF bands of the radio frequency spectrum, and can intermodulate with received television signals to cause severe picture beat patterns on several television channels. Additional details of this RFI suppression technique are found in a copending U.S. patent application of G. E. Thornberry, Ser. No. 038,101 titled "Radio Frequency Interference Suppression Apparatus".

Output signals from filter 60 are applied to filter 80 via a high input impedance, low output impedance emitter follower buffer transistor 75. Filter 60 is thereby isolated from filter 80 such that undesired interaction between these filters is avoided. The low input source impedance required for proper operation of filter 80 is also provided by means of the low emitter impedance of transistor 75.

The frequency at which filter 80 develops a peak amplitude response (approximately 4.5 MHz). is determined by the coaction of capacitors 87 and 90 with a parallel-tuned LC network including an inductor 84 and a capacitor 85. The LC network is coupled in series with the signal path including a resistor 82. Capacitors 87 and 90 also provide impedance transformation and assist to determine the "Q" of filter 80. An additional 10.7 MHz. trap is provided by means of the parallel resonant combination of inductor 84, capacitor 85, and the parasitic capacitance of inductor 84.

Figure 6:
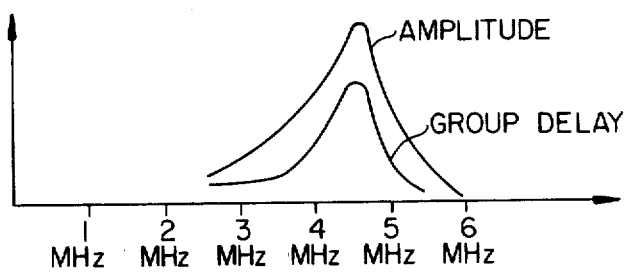

The amplitude and group delay response of filter 80 is shown in FIG. 6. Output signals are provided from the wiper of a pre-set level control potentiometer 92, and are AC coupled via a capacitor 94 to chrominance processor 48 (FIG. 1).

Figure 7:
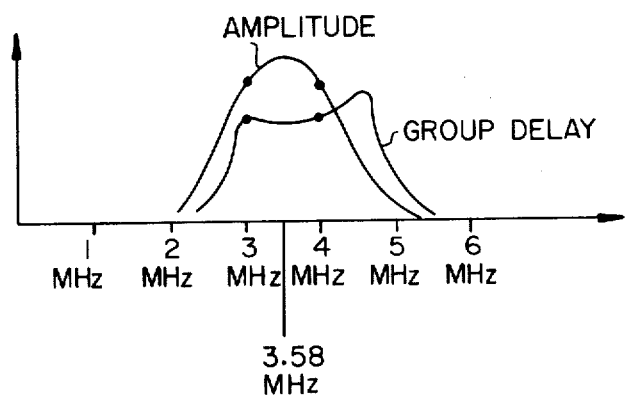

The overall chrominance signal response produced by network 45 (filters 60 and 80), when included in the television receiver system of FIG. 1, is illustrated by FIG. 7. In accordance with this response, chrominance signals supplied from network 45 to chrominance processor 48 (FIG. 1) exhibit the desired symmetrical amplitude response, notably between 3.08 MHz. and 4.08 MHz. Such signals also exhibit a substantially flat group delay response and a corresponding linear phase response (see also FIG. 4) over this frequency range.

The response also advantageously exhibits suppression of 10.7 MHz. frequency components, the second harmonic of the chrominance subcarrier signal (approximately 7.16 MHz), and very high frequency RFI components. Shaping of the symmetrical amplitude response is accomplished by the coaction of filters 60 and 80, while the delay compensation is primarily provided by means of the delay response of filter 60. In the latter regard it is noted that the group delay response slope of filter 60 (FIG. 5) is opposite that of the detected video response (FIG. 3) between 3.58 MHz. and 4.08 MHz. That is, over the frequency range the detected video output delay is increasing while the delay response of filter 60 is decreasing in a compensating sense. This decreasing delay response of filter 60 is also in a direction to compensate for the increasing delay associated with filter 80 over this frequency range.

As noted earlier, inductor 68 of filter 60 and inductor 84 of filter 80, both arranged in series with the signal path, each separately provide a means of suppressing the 10.7 MHz. switching signal in the output of network 45, the presence of which would otherwise distort the demodulated chrominance information. The two 10.7 MHz, signal suppression circuits are readily provided in the arrangement of network 45 without increasing circuit cost or complexity, and serve to ensure the reliable suppression of the undesired 10.7 MHz, signal.

The described filter network does not require costly precision tolerance components (5% tolerance components are satisfactory), and does not require frequency alignment from one receiver to another during receiver manufacture. The arrangement of network 45 also advantageously permits a receiver designer to tailor the operating parameters of one of filter sections 60 or 80 to suit the requirements of a particular receiver design, without affecting the operating parameters of the other filter section.

What is claimed is:

1. A color television receiver system for processing a video signal containing a luminance component, and a chrominance component with a modulated color subcarrier, disposed within a frequency spectrum of said video signal in frequency interleaved relation, including: a source of timing signals; a comb filter responsive to said video signal and to said timing signals for providing at a first output a combed luminance signal with amplitude peaks at integral multiples of an image line scanning frequency and amplitude nulls at odd multiples of one-half said line frequency, and for providing at a second output a signal with amplitude peaks at odd multiples of one-half said line frequency and amplitude nulls at integral multiples of said line frequency; means for demodulating chrominance signals derived from said second output of said comb filter; and signal translating means included in a signal coupling path between said second comb filter output and said demodulating means, and responsive to signals from said second comb filter output for supplying chrominance signals to said demodulating means with a substantially symmetrical amplitude and linear phase response, said signal translating means comprising:

first bandpass filter means for receiving signals from said second output of said comb filter inclusive of said desired chrominance signals and undesired components at the frequency of said signal, said first filter means comprising first and second cascaded resonant circuits tuned to provide a maximum amplitude response at a frequency greater than the frequency of said color subcarrier; and second bandpass filter means with an input for receiving filtered signals from said first bandpass filter means, and an output coupled to said demodulating means, said second filter means being tuned to provide a maximum amplitude response at a frequency greater than said color subcarrier frequency.

2. Signal translating means according to claim 1, wherein:

said first filter means is tuned to a first frequency between said color subcarrier frequency and a frequency corresponding to the second harmonic of said color subcarrier frequency; and said second filter means is tuned to a second frequency different from said first frequency.

3. Signal translating means according to claim 2, wherein said second frequency is greater than said first frequency.

4. Signal translating means according to claim 1, wherein said first filter means comprises a resonant input circuit arranged in shunt with said signal path, and a resonant output circuit coupled in series with said signal path; and said second filter means comprises a single-tuned resonant circuit coupled in series with said signal path and tuned to said second frequency.

5. Signal translating means according to claim 4, wherein said resonant input and outut circuits of said first filter means are tuned to said first frequency.

6. Signal translating means according to claim 5, wherein said resonant input circuit of said first filter means comprises a parallel resonant circuit;

said resonant output circuit of said first filter means comprises a series resonant circuit; and said resonant circuit of said second filter means comprises a series resonant circuit.

7. Signal translating means according to claim 6, wherein said resonant input circuit of said first filter means comprises an input capacitor exhibiting a low impedance to high frequency signals above the chrominance signal band, so that said high frequency signals are bypassed from said signal path.

8. Signal translating means according to claim 7, wherein said resonant output circuit of said first filter means comprises a first inductor coupled in series with said signal path, said first inductor being tuned to resonate with a parasitic capacitance associated with said first inductor at the frequency of said comb filter timing signals to suppress said timing signals in the output of said first filter means.

9. Signal translating means according to claim 8, wherein said resonant circuit of said second filter means comprises a second inductor coupled in series with said signal path, said second inductor being tuned to resonate with a parasitic capacitance associated with said second inductor at the frequency of said comb filter timing signals to suppress said timing signals in the output of said second filter means.

10. Signal translating means according to claims 8 or 9, wherein said timing signal frequency corresponds to the third harmonic of said color subcarrier frequency.

11. Signal translating means according to claim 4, and further comprising a signal buffer network with a high input impedance and a relatively low output impedance for coupling output signals from said first filter means to said second filter means.

12. Signal translating means according to claim 1, wherein said comb filter is contained within a conductive enclosure coupled to a point of radio frequency reference potential, said enclosure including a surface defining an aperture through which said second output of said comb filter is coupled via a signal conducting path; and said first resonant circuit of said first bandpass filter means comprises an input network including a capacitor having a first plate coupled to said signal path and a second plate coupled to a point of radio frequency reference potential, and wherein said capacitor is located in close proximity with said surface.

13. Signal translating means according to claim 12, wherein said surface and said first plate of said capacitor are of substantially planar configuration, said first plate and said surface being oriented in a substantially parallel planar relationship.

* * * * *